US012025027B2

(12) United States Patent
Shiramasa et al.

(10) Patent No.: US 12,025,027 B2
(45) Date of Patent: Jul. 2, 2024

(54) TURBINE BLADE AND GAS TURBINE

(71) Applicant: MITSUBISHI HEAVY INDUSTRIES, LTD., Tokyo (JP)

(72) Inventors: Yamato Shiramasa, Tokyo (JP); Yasuo Miyahisa, Tokyo (JP); Shunsuke Torii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/142,307

(22) Filed: May 2, 2023

(65) Prior Publication Data

US 2023/0383655 A1 Nov. 30, 2023

(30) Foreign Application Priority Data

May 24, 2022 (JP) ................................ 2022-084687

(51) Int. Cl.
*F01D 5/14* (2006.01)

(52) U.S. Cl.
CPC ............ *F01D 5/14* (2013.01); *F05D 2220/32* (2013.01); *F05D 2240/30* (2013.01)

(58) Field of Classification Search
CPC ..... F01D 5/14; F05D 2220/32; F05D 2240/30
USPC ...................................................... 416/223 R
See application file for complete search history.

(56) References Cited

U.S. PATENT DOCUMENTS 6,254,334 B1 * 7/2001 LaFleur .................. F01D 25/12 415/115
2004/0018082 A1 1/2004 Soechting et al.
2017/0260864 A1 * 9/2017 Leon ....................... F01D 5/187

FOREIGN PATENT DOCUMENTS

JP 2004-60638 2/2004
JP 2009-287511 12/2009

* cited by examiner

*Primary Examiner* — Yi-Kai Wang
(74) *Attorney, Agent, or Firm* — Wenderoth, Lind & Ponack, L.L.P.

(57) ABSTRACT

A turbine blade includes: a pin fin passage formed inside a trailing edge portion of an airfoil part, extending toward a trailing edge of the airfoil part, and opening to outside of the airfoil part at the trailing edge; and a plurality of pin fins connecting a pair of facing inner walls constituting the pin fin passage. The pin fin passage includes a first region and a second region on the trailing edge side of the first region. The plurality of pin fins includes a plurality of first pin fins disposed in the first region and a plurality of second pin fins disposed in the second region. A first diameter of the first pin fins is larger than a second diameter of the second pin fins. A first pin pitch of the first pin fins is larger than a second pin pitch of the second pin fins.

15 Claims, 7 Drawing Sheets

FIG. 6

| | FIRST REGION | SECOND REGION | THIRD REGION |
|---|---|---|---|
| d | d1 | d2 | d3 |
| p | p1 | p2 | p3 |
| p/d | p1/d1 | p2/d2 | p3/d3 |
| COOLING PERFORMANCE | HIGH | HIGH | LOW |

TURBINE BLADE AND GAS TURBINE

TECHNICAL FIELD

The present disclosure relates to a turbine blade and a gas turbine.

BACKGROUND ART

Turbine blades of gas turbines are known to cool the trailing edge portions of the blades via pin fins (see Patent Document 1, for example)

CITATION LIST

Patent Literature

Patent Document 1: JP2004-60638A

SUMMARY

For example, in the turbine blade described in Patent Document 1, a leading edge path and a trailing edge path are formed inside the airfoil part (blade body), and a pin fin passage consisting of a passage between pin fins is formed on the trailing edge side of the blade body. The cooling air after cooling the leading edge path and the trailing edge path flows through the pin fin passage to perform pin fin cooling.

For example, in a turbine blade with a passage configuration for cooling air such as the turbine blade described in Patent Document 1, the metal temperature is relatively high in the region where the leading edge and trailing edge paths are provided, and may be excessively cooled in the region on the trailing edge side of the blade body where the pin tin passage is provided. In such cases, it is conceivable to control the metal temperature by expanding the region of the pin fin passage to the leading edge side.

However, in the region of the pin fin passage expanded to the leading edge side, the distance between the pair of facing inner walls that constitutes the pin fin passage increases, making the length of the pin fins in this region longer. This makes it more difficult to cast the turbine blade, as the pin fins in this region are more likely to break during the casting process.

In view of the above, an object of at least one embodiment of the present disclosure is to provide a turbine blade that can improve the cooling performance while ensuring castability, and a gas turbine including the turbine blade.

(1) A turbine blade according to at least one embodiment of the present disclosure includes: an airfoil part; a pin fin passage formed inside a trailing edge portion of the airfoil part, extending toward a trailing edge of the airfoil part, and opening to outside of the airfoil part at the trailing edge; and a plurality of pin fins connecting a pair of facing inner walls constituting the pin fin passage. The pin fin passage includes a first region and a second region on the trailing edge side of the first region. The plurality of pin fins includes a plurality of first pin fins disposed in the first region and a plurality of second pin fins disposed in the second region. A first diameter of the plurality of first pin fins is larger than a second diameter of the plurality of second pin fins. A first pin pitch of the plurality of first pin fins is larger than a second pin pitch of the plurality of second pin fins. A value obtained by dividing the first pin pitch by the first diameter is smaller than a value obtained by dividing the second pin pitch by the second diameter.

(2) A turbine according to at least one embodiment of the present disclosure includes the turbine blade having the above configuration (1).

At least one embodiment of the present disclosure provides a turbine blade that can improve the cooling performance while ensuring castability, and a gas turbine including the turbine blade.

BRIEF DESCRIPTION OF DRAWINGS

FIG. 6 is a table for describing the dimension of pin fins.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Hereinafter, a turbine blade according to some embodiments will be described with reference to the drawings.

Gas Turbine 100

Figure 1:
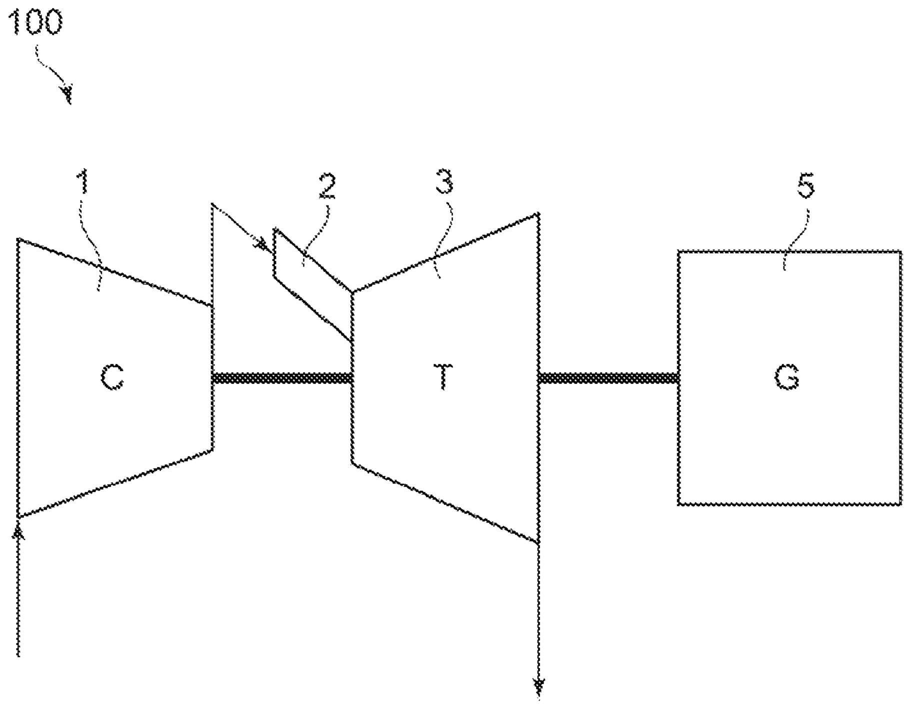
FIG. 1 is a schematic configuration diagram of a gas turbine including a turbine blade according to some embodiments.

As shown in FIG. 1, the gas turbine 100 according to some embodiments includes a compressor 1 for compressing air to produce compressed air, a plurality of combustors 2 for mixing the compressed air with fuel supplied from a fuel supply source (not shown) and combusting the mixture to produce combustion gas, and a turbine 3 rotationally driven by the combustion gas FG.

Figure 2:
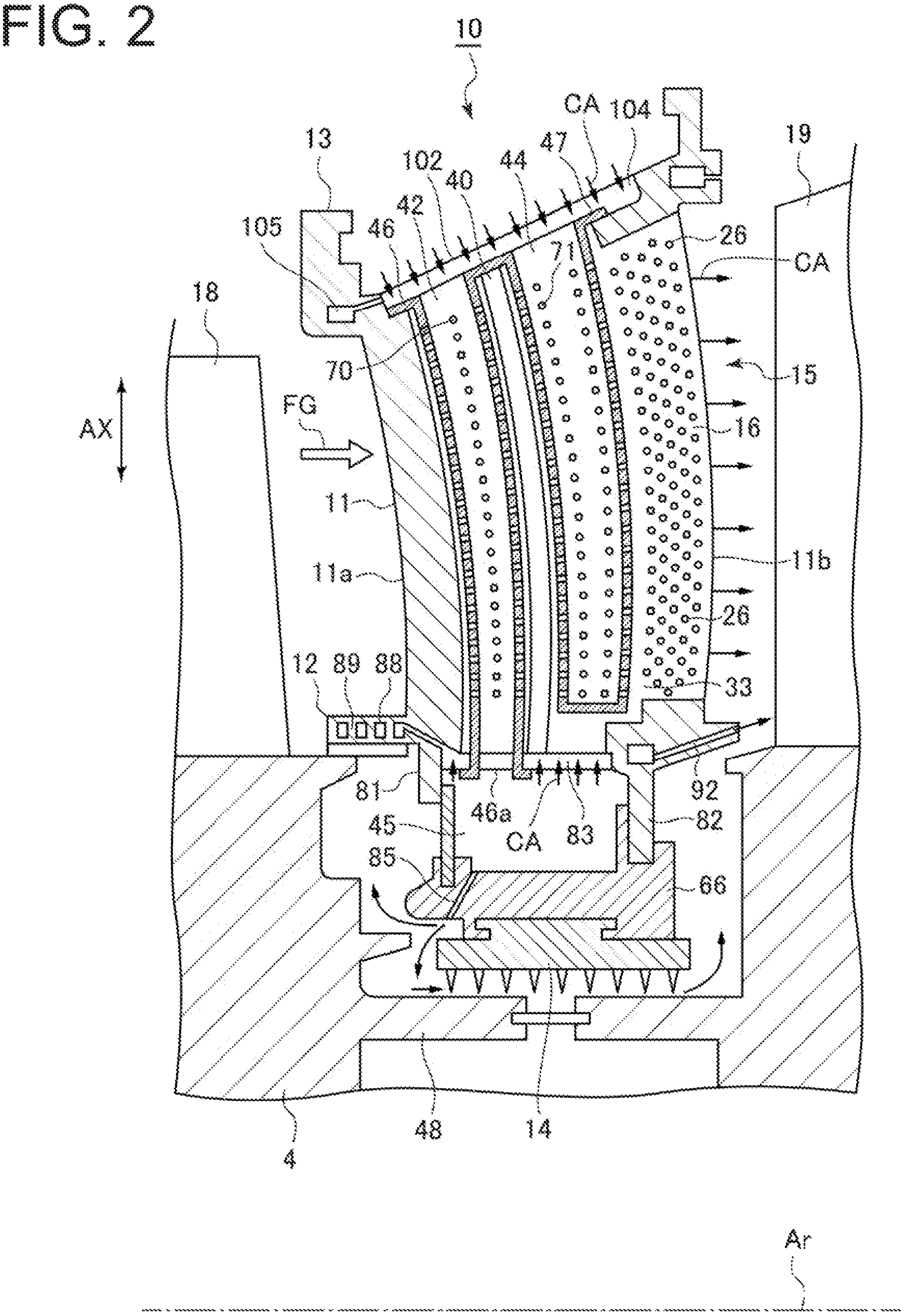
FIG. 2 is a cross-sectional view of the turbine blade according to some embodiments.

As shown in FIG. 2, the turbine 3 has a rotor 4 that rotates around the axis Ar. The rotor 4 is connected to, for example, a generator 5 (see FIG. 1) to generate power by rotating the rotor 4.

The turbine blade 10 according to some embodiments can be applied to stator vanes of the turbine 3, for example.

Turbine Blade 10

As shown in FIG. 2, the turbine blade 10 includes a blade body (airfoil part) 11, and an inner shroud 12 and an outer shroud 13 disposed on the inner and outer sides of the blade body 11, respectively.

The blade body 11 has a leading edge path 42 and a trailing edge path 44 formed by a rib 40 inside the blade body. In the leading edge path 42 and the trailing edge path 44, bottomed cylindrical inserts 46,47 with a plurality of cooling air holes 70,71 on the periphery and bottom are inserted from the outer shroud 13 side.

The blade body 11 has a pin fin passage 16, which is a passage with a plurality of pin fins 26, near the trailing edge 11*b*. The pin fin passage 16 will be described later in detail.

When cooling air CA is fed into the inserts 46, 47 from a manifold (not shown), the cooling air CA is blown out through the cooling air holes 70, 71 and impinges on the inner walls of the leading edge path 42 and the trailing edge path 44 to perform so-called impingement cooling, and flows through the pin fin passage 16 on the trailing edge side of the blade body 11 to perform pin fin cooling.

The rib 40 has a through hole (not shown) penetrating the rib 40 between the end surfaces on the leading edge 11*a* and trailing edge 11*b* sides, so that the cooling air CA can flow from the leading edge path 42 to the trailing edge path 44 through the through hole.

The inner shroud 12 has a forward flange 81 and a rearward flange 82 on the leading edge 11*a* and trailing edge 11*b* sides, and is connected to a seal supporting part 66 which supports a seal 14 for sealing between an arm part 48 of the rotor 4 and the seal supporting part 66. Further, a cavity 45 is formed between the seal supporting part 66 and the inner shroud 12, and the cooling air CA flowing out of an opening end 46*a* of the insert 46 is also supplied into the cavity 45.

The seal supporting part 66 has a passage 85 on the front side (upstream side in the axis Ar direction), through which the air is discharged from the cavity 45 and flows from an upstream rotor blade 18 to a downstream rotor blade 19 through the gap of the seal 14, keeping the inside of the blade at a higher pressure than the passage for the hot combustion gas FG and preventing the hot combustion gas FG from entering the inside.

Inner Shroud 12

Figure 3:
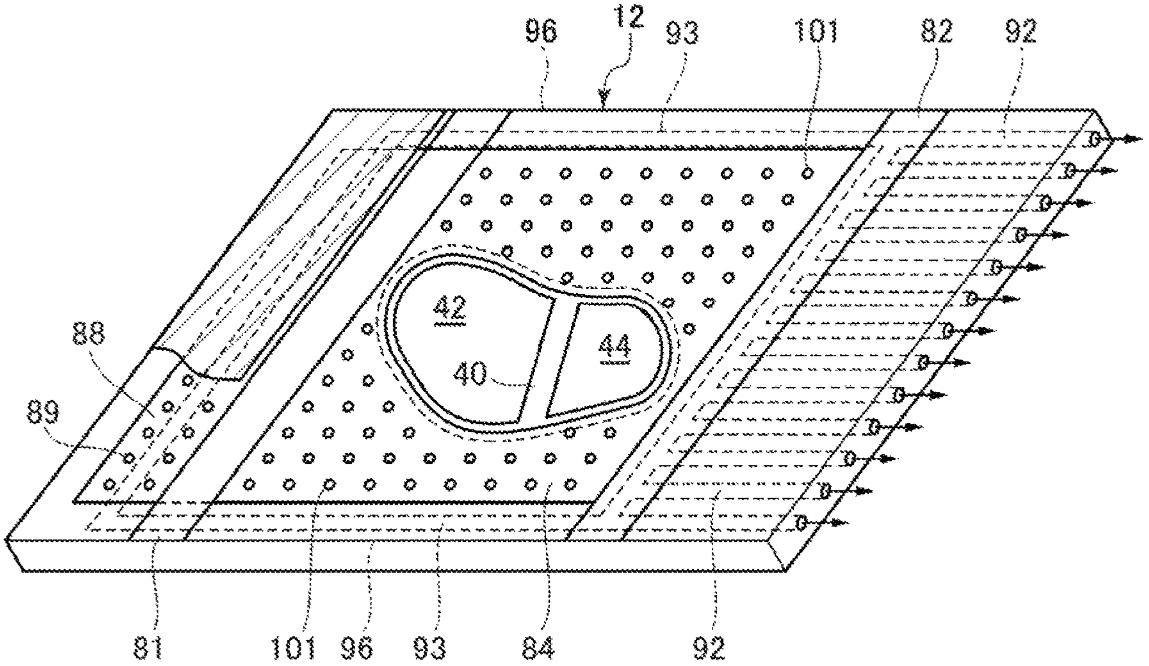
FIG. 3 is a perspective view of the inner shroud of the turbine blade according to some embodiments, as viewed from the bottom.

As shown in FIG. 3, the inner shroud 12 has a leading edge passage 88 with multiple needle fins 89 on the leading edge 11*a* side. Further, rails 96 are formed on both side portions of the inner shroud 12 along the front-rear direction. Each rail 96 is provided with a side passage 93 which communicates at one end with the leading edge passage 88 and opens at the other end to the combustion gas FO at the trailing edge of the inner shroud 12.

On the bottom of the inner shroud 12, an impingement plate 84 with a plurality of small holes 101 is provided away from the bottom surface. The impingement plate 84 forms a chamber 83 (see FIG. 2) on the bottom side of the inner shroud 12.

Further, the inner shroud 12 has a plurality of trailing edge passages 92 on the trailing edge side, which communicate at one end with the side passages 93 and open at the other end to the combustion gas FG.

The cooling air CA supplied into the cavity 45 also flows into the chamber 83 through the small holes 101I of the impingement plate 84. When the cooling air CA flows into the chamber 83 through the small holes 101 of the impingement plate 84, it impinges on the bottom surface of the inner shroud 12 to perform impingement cooling. The cooling air CA supplied into the chamber 83 is then transferred into the leading edge passage 88 of the inner shroud 12, passes between the needle fins 89 to cool the leading edge side of the inner shroud 12, and then passes through the side passages 93 and is released from the trailing edge of the inner shroud 12 into the combustion gas FG through the trailing edge passages 92.

Outer Shroud 13

Figure 4:
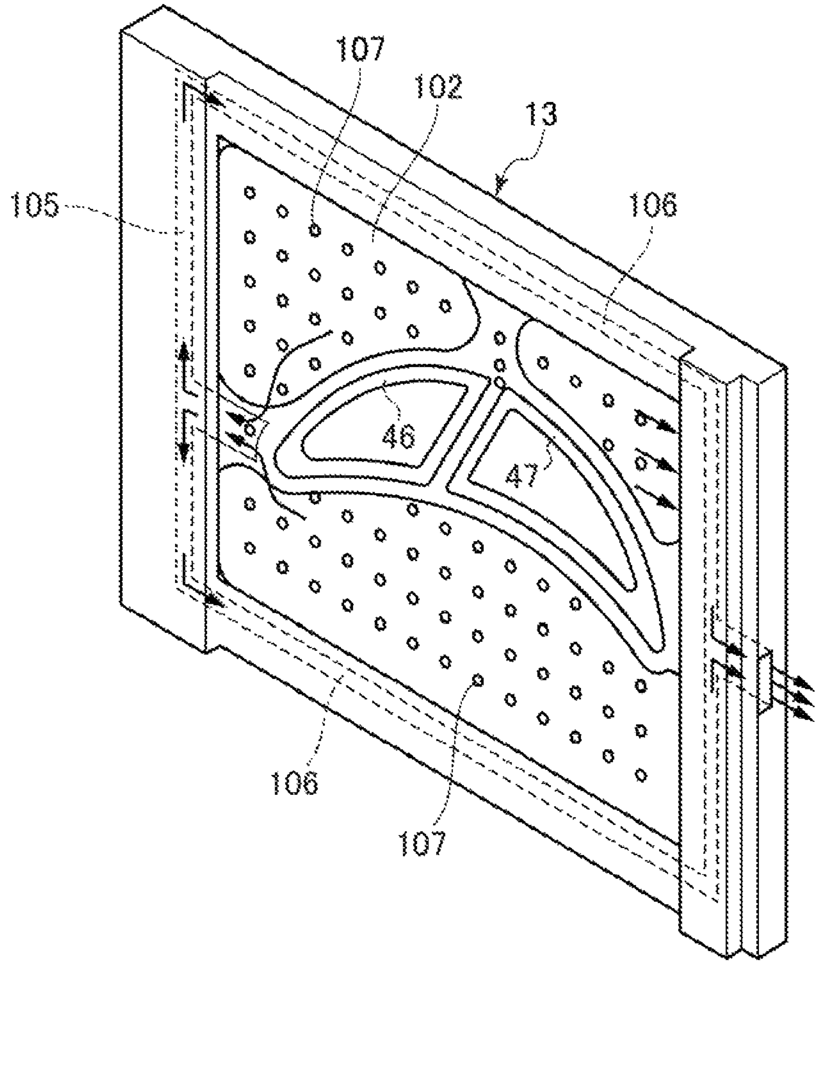
FIG. 4 is a perspective view of the outer shroud of the turbine blade according to some embodiments, as viewed from the top.

As shown in FIG. 4, on the top of the outer shroud 13, an impingement plate 102 with a plurality of small holes 107 is provided away from the top surface. The impingement plate 102 forms a chamber 104 (see FIG. 2) on the top side of the outer shroud 13.

Further, the outer shroud 13 has a leading edge passage 105 and side passages 106 formed on both side portions of the outer shroud 13. Each side passage 106 communicates with the leading edge passage 105 on the front side and opens at the trailing edge of the outer shroud 13. The leading edge passage 105 communicates with one chamber 104.

The cooling air CA supplied into a manifold (not shown) flows into the chamber 104 through the small holes 107 of the impingement plate 102 and is released from the trailing edge of the side passage 106. When the cooling air CA flows into the chamber 104 through the small holes 107 of the impingement plate 102, it impinges on the top surface of the outer shroud 13 to perform impingement cooling.

The cooling air CA flowing into the chamber 104 also flows into the leading edge passage 105, passes through the leading edge passage 105 and the side passages 106 to cool the leading edge and the both side portions of the outer shroud 13, and then is released from the trailing edge of the outer shroud 13.

Pin Fin Passage 16

Figure 5:
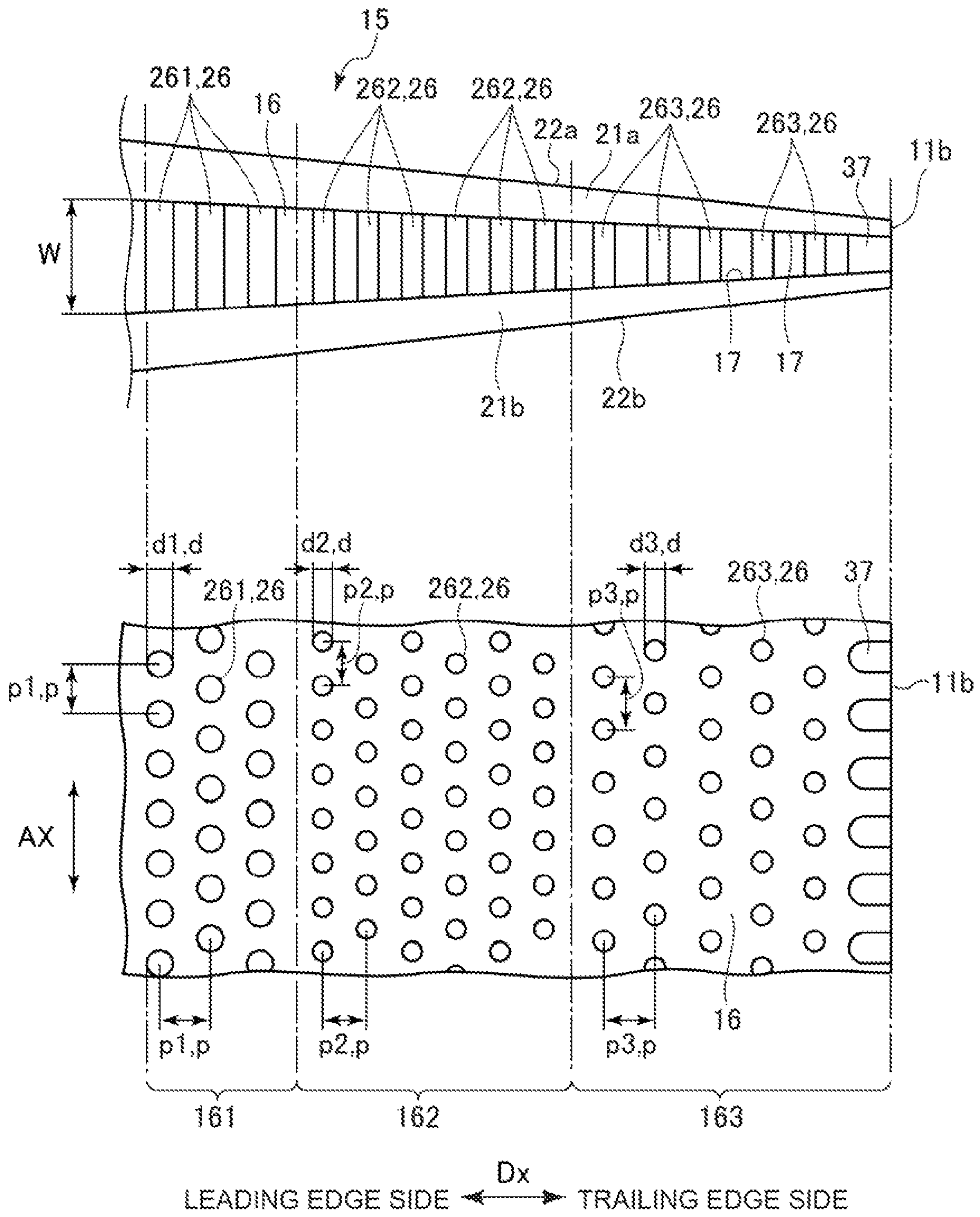
FIG. 5 is a diagram showing a blade trailing edge portion of the turbine blade according to some embodiments. The upper section is a cross-section of the turbine blade taken in a plane substantially perpendicular to the vertical axis of the turbine blade, and the lower section is a cross-section of the turbine blade taken in a plane substantially parallel to the vertical axis of the turbine blade.

As shown in FIGS. 2 and 5, the turbine blade 10 according to some embodiments includes a pin fin passage 16 formed inside a trailing edge portion 15 of the blade body 11, extending toward the trailing edge 11*b* of the blade body 11, and opening to the outside of the blade body 11 at the trailing edge 11*b*. The turbine blade 10 according to some embodiments includes a plurality of pin fins 26 connecting a pair of facing inner walls 17 constituting the pin fin passage 16. The pair of facing inner walls 17 constituting the pin fin passage 16 are a suction-side wall portion 21*a* and a pressure-side wall portion 21*b* of the blade body 11. The suction-side wall portion 21*a* and the pressure-side wall portion 21*b* shown in the upper section of FIG. 5 are actually curved along a suction-side wall surface 22*a* and a pressure-side wall surface 22*b*, but in FIG. 5, the suction-side wall portion 21*a* and the pressure-side wall portion 21*b* are simplified and represented without curvature for ease of illustration.

As shown in the upper section of FIG. 5, the passage width W of the pin fin passage 16. i.e., the distance between the pair of facing inner walls 17, gradually decreases (tapers) from the leading edge 11*a* to the trailing edge 11*b*.

Further, as shown in the upper and lower sections of FIG. 5, the pin fin passage 16 includes, for example, a first region 161, a second region 162, and a third region 163 from the leading edge 11*a* to the trailing edge 11*b*.

The plurality of pin fins 26 in the pin fin passage 16 includes a plurality of first pin fins 261 disposed in the first region 161, a plurality of second pin fins 262 disposed in the second region 162, and a plurality of third pin fins 263 disposed in the third region 163.

In the turbine blade 10 according to some embodiments, the diameter d of the plurality of pin fins 26 is set, for example, as follows. For example, the value of the diameter d of the first pin fins 261 is the first diameter d1, the value of the diameter d of the second pin fins 262 is the second diameter d2, and the value of the diameter d of the third pin fins 263 is the third diameter d3.

In the turbine blade 10 according to some embodiments, the first diameter d1 is larger than the second diameter d2 (d2<d1), and the third diameter d3 is equal to the second diameter d2 (d2=d3).

In the turbine blade 10 according to some embodiments, the pin fins 26 are formed such that the first pin pitch p1, which is the pin pitch (array pitch in the direction substantially parallel to the vertical axis AX of the blade body 11, i.e., the distance between the centers of the pin fins 26 in the direction along the vertical axis AX, and the array pitch in the direction Dx substantially perpendicular to the vertical axis AX of the blade body 11, i.e., the distance between rows of pin fins (plurality of pin fins 26 arranged along the vertical axis AX)) p of the first pin fins 261, is larger than the second pin pitch p2, which is the pin pitch p of the second pin fins 262 (p2<p1), and the second pin pitch p2 of the second pin fins 262 is smaller than the third pin pitch p3, which is the pin pitch p of the third pin fins 263 (p2<p3).

In this example, the pin fins 26 in the same region have the same pin pitch p (in the case of first region 161, first pin pitch p1) in the direction substantially parallel to the vertical axis AX of the blade body 11 and in the direction substantially perpendicular to the vertical axis AX of the blade body 11, but the array pitches in the directions substantially parallel and perpendicular to the vertical axis AX may not be the same and may be different. However, as for the change rate of array pitch compared between each region, it is preferable that the array pitches in the direction substantially parallel to the vertical axis AX and in the direction substantially perpendicular to the vertical axis AX change at the same rate.

In the turbine blade 10 according to some embodiments, the cooling performance in the pin fin passage 16 varies with p/d, which is a value obtained by dividing the pin pitch p by the diameter d of the pin fins 26. In the following description, the value p/d obtained by dividing the pin pitch p by the diameter d of the pin (ins 26 is also referred to as diameter-pitch ratio p/d.

Figure 7:
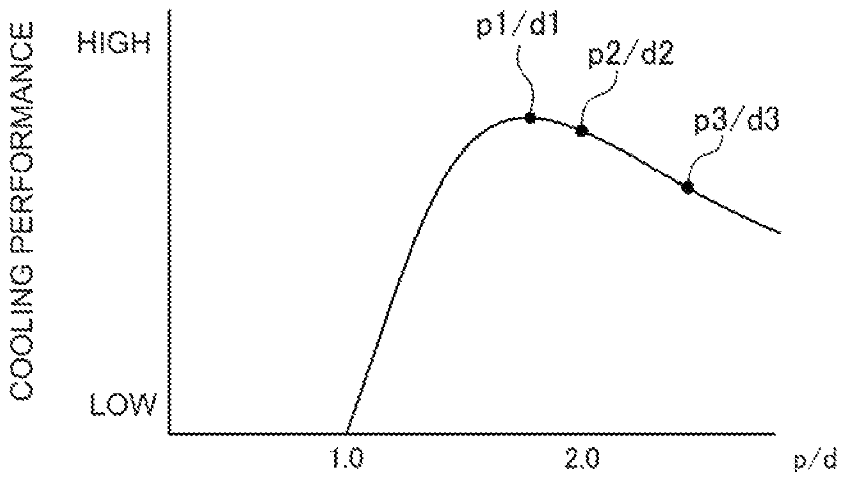
FIG. 7 is a diagram for describing the relationship between the dimension of pin fins and the cooling performance of the pin tin passage.

For example, as shown in FIG. 7, in the turbine blade 10 according to some embodiments, the cooling performance in the pin fin passage 16 is maximum when the diameter-pitch ratio p/d is between 1.0 and 2.0, more specifically between 1.5 and 2.0. When the diameter-pitch ratio p/d is 1.0, no gap exists between adjacent pin fins, so the cooling air CA cannot flow through the pin fin passage 16.

As shown in FIG. 7, the smaller the diameter-pitch ratio p/d, the higher the cooling performance in the pin fin passage 16. However, as described above, the cooling performance in the pin tin passage 16 is maximum around the diameter-pitch ratio p/d between 1.5 and 2.0. Therefore, if the diameter-pitch ratio p/d is too small, the cooling performance in the pin fin passage 16 decreases as the diameter-pitch ratio p/d decreases. In other words, the cooling performance in the pin fin passage 16 increases as the diameter-pitch ratio p/d decreases within the range where the diameter-pitch ratio p/d is not too small.

In the region on the leading edge 11*a* side of the pin fin passage 16, the distance (passage width W) between the pair of facing inner walls 17 constituting the pin fin passage 16 is larger than that on the trailing edge 11*b* side of the pin fin passage 16. Therefore, the length of the pin fins 26 in the region on the leading edge 11*a* side of the pin fin passage 16 is longer, which makes it more difficult to cast the turbine blade 10, as the pin fins 26 in this region are more likely to break during casting.

In order to improve castability, it is conceivable to increase the diameter d of the pin fins 26 in the region. However, simply increasing the diameter d of the pin fins 26 without changing the pin pitch p of the pin fins 26 may reduce the cooling performance in this region due to the diameter-pitch ratio p/d becoming too small.

Therefore, in the turbine blade 10 according to some embodiments, the first diameter d1 is larger than the second diameter d2 (d2<d1).

When the first diameter d1 is larger than the second diameter d2, castability can be ensured even if the length of the first pin fins 261 is long.

In the turbine blade 10 according to some embodiments, the diameter-pitch ratio p/d (p1/d1) of the first pin fins 261 is smaller than the diameter-pitch ratio p/d (p2/d2) of the second pin fins 262.

When the diameter-pitch ratio p/d (p1/d1) of the first pin fins 261 is smaller than the diameter-pitch ratio p/d (p2/d2) of the second pin fins 262, the cooling performance in the first region 161 can be greater than that in the second region 162.

In the turbine blade 10 according to some embodiments, the first pin pitch p1 is larger than the second pin pitch p2 (p2<p1).

When the first pin pitch p1 is larger than the second pin pitch p2, it is possible to avoid a reduction in cooling performance in the first region 161 due to the diameter-pitch ratio p/d becoming too small.

Therefore, with the turbine blade 10 according to some embodiments, it is possible to improve the cooling performance while ensuring castability in the first region 161. Moreover, with the turbine blade 10 according to some embodiments, it is possible to reduce the flow rate of cooling air CA by improving the cooling performance.

In the gas turbine 100 according to some embodiments, since the turbine blade 10 according to some embodiments is included, the flow rate of cooling air CA in the turbine blade 10 can be suppressed, and the performance of the gas turbine 100 can be improved.

In the turbine blade 10 according to some embodiments, the first region 161 may be a region closest to the leading edge 11*a* of the blade body 11 in the pin fin passage 16.

The region closest to the leading edge 11*a* of the blade body 11 in the pin fin passage 16 has a larger distance (passage width W) between the pair of facing inner walls 17 constituting the pin fin passage 16 than the other regions, making the length of the pin fins 26 longer and more difficult to cast than the other regions.

With the turbine blade 10 according to some embodiments, in the first region 161, where the length of the pin fins 26 is longer and more difficult to cast than in the other regions, it is possible to improve the cooling performance while ensuring castability in the first region 161.

In the turbine blade 10 according to some embodiments, the second region 162 may be adjacent to the first region 161.

Thereby, it is possible to improve the cooling performance while ensuring castability in the region (first region 161) adjacent to the leading edge 11*a* side of the second region 162.

In the turbine blade 10 according to some embodiments, the diameter-pitch ratio p/d (p3/d3) of the third pin fins 263 may be larger than the diameter-pitch ratio p/d (p2/d2) of the second pin tins 262.

In the third region 163 on the trailing edge 11*b* side of the second region 162, the cooling performance may be more suppressed than in the second region 162. Therefore, the diameter-pitch ratio p/d (p3/d3) of the third pin fins 263 may be larger than the diameter-pitch ratio p/d (p2/d2) of the second pin fins 262.

By increasing the diameter-pitch ratio p/d (p3/d3) of the third pin fins 263, the size of the third pin pitch p3 relative to the third diameter d3 increases, so that the proportion of the third pin fins 263 in the third region 163 decreases, suppressing the pressure loss of cooling air CA in the third region 163.

In the turbine blade 10 according to some embodiments, the third diameter d3 may be equal to the second diameter d2 (d3=d2).

In the third region 163 on the trailing edge 11*b* side of the second region 162, the distance (passage width W) between the pair of facing inner walls 17 constituting the pin fin passage 16 is smaller than that in the second region 162. Therefore, there is no need to make the third diameter d3 of the third pin fins 263 larger than the second diameter d2 of the second pin fins 262 as in the first region 161. As described above, the diameter-pitch ratio p/d has a significant effect on the cooling performance. Further, when the third diameter d3 is equal to the second diameter d2, the size relationship between the diameter-pitch ratio p/d (p2/d2) of the second pin fins 262 and the diameter-pitch ratio p/d (p3/d3) of the third pin fins 263 can be set only by the relationship between the second pin pitch p2 and the third pin pitch p3. Therefore, by making the third diameter d3 equal to the second diameter d2, the cooling performance in the third region 163 can be easily set at the design stage of the turbine blade 10.

In the turbine blade 10 according to some embodiments, the third pin pitch p3 may be larger than the second pin pitch p2 (p2<p3).

As described above, in the third region 163 on the trailing edge 11*b* side of the second region 162, the cooling performance may be more suppressed than in the second region. Therefore, the diameter-pitch ratio p/d (p3/d3) of the third pin fins 263 may be larger than the diameter-pitch ratio p/d (p2/d2) of the second pin fins 262.

To increase the diameter-pitch ratio p/d (p3/d3) of the third pin fins 263, the third pin pitch p3 may be increased, or the third diameter d3 may be decreased. However, when the third diameter d3 is decreased, the castability of the third pin fins 263 may decrease.

Therefore, by increasing the third pin pitch p3 larger than the second pin pitch p2, the diameter-pitch ratio p/d (p3/d3) of the third pin fins 263 can be increased while ensuring castability of the third pin fins 263.

In the turbine blade 10 according to some embodiments, the third pin pitch p3 may be equal to or larger than the first pin pitch p1 (p1≤p3).

As described above, the diameter-pitch ratio p/d (p1/d1) of the first pin fins 261 is smaller than the diameter-pitch ratio p/d (p2/d2) of the second pin fins 262. Further, the diameter-pitch ratio p/d (p3/d3) of the third pin fins 263 may be larger than the diameter-pitch ratio p/d (p2/d2) of the second pin fins 262. Therefore, the diameter-pitch ratio p/d (p3/d3) of the third pin fins 263 may be larger than the diameter-pitch ratio p/d (p1/d1) of the first pin fins 261. Accordingly, the third pin pitch p3 may be equal to or larger than the first pin pitch p1.

In the turbine blade 10 according to some embodiments, the third pin pitch p3 may be smaller than the first pin pitch p1 (p3<p1).

That is, the third pin pitch p3 can be smaller than the first pin pitch p1 if the diameter-pitch ratio p1d (p3/d3) of the third pin fins 263 is larger than the diameter-pitch ratio p/d (p1/d1) of the first pin fins 261.

The present disclosure is not limited to the embodiments described above, but includes modifications to the embodiments described above, and embodiments composed of combinations of those embodiments.

For example, the cross-sectional shape of the pin fin 26 according to the above-described embodiments is not limited to a circular shape, but may be any shape, such as an airfoil, streamlined, polygonal, elliptical, etc. When the cross-sectional shape of the pin fin 26 is other than circular, the diameter d of the pin fin 26 may be the equivalent circle diameter of the cross-sectional shape. The pin pitch p may be the distance between the centroids of the cross-sectional shapes of two adjacent pin fins 26

The turbine blade 10 according to the above-described embodiments can be applied to stator vanes of the turbine 3, but it can also be applied to rotor blades.

The contents described in the above embodiments would be understood as follows, for instance.

(1) A turbine blade according to at least one embodiment of the present disclosure includes: an airfoil part (blade body 11); a pin fin passage 16 formed inside a trailing edge portion 15 of the airfoil part (blade body 11), extending toward a trailing edge 11*b* of the airfoil part (blade body 11), and opening to the outside of the airfoil part (blade body 11) at the trailing edge 11*b*; and a plurality of pin fins 26 connecting a pair of facing inner walls 17 constituting the pin fin passage 16. The pin fin passage 16 includes a first region 161 and a second region 162 on the trailing edge 11*b* side of the first region 161. The plurality of pin fins 26 includes a plurality of first pin fins 261 disposed in the first region 161 and a plurality of second pin fins 262 disposed in the second region 162. A first diameter d1 of the plurality of first pin fins 261 is larger than a second diameter d2 of the plurality of second pin fins 262. A first pin pitch p1 of the plurality of first pin fins 261 is larger than a second pin pitch p2 of the plurality of second pin fins 262. A value (p1/d1) obtained by dividing the first pin pitch p1 by the first diameter d1 is smaller than a value (p2/d2) obtained by dividing the second pin pitch p2 by the second diameter d2.

With the above configuration (1), since the first diameter d1 of the plurality of first pin fins 261 is larger than the second diameter d2 of the plurality of second pin fins 262, castability can be ensured even if the length of the first pin fins 261 is long. With the above configuration (1), since the value (p1/d1) obtained by dividing the first pin pitch p1 by the first diameter d1 is smaller than the value (p2/d2) obtained by dividing the second pin pitch p2 by the second diameter d2, the cooling performance in the first region 161 can be greater than that in the second region 162. Further, with the above configuration (1), since the first pin pitch p1 of the plurality of first pin fins 261 is larger than the second pin pitch p2 of the plurality of second pin fins 262, it is possible to avoid a reduction in cooling performance in the first region 161 due to the diameter-pitch ratio p/d becoming too small. Therefore, with the above configuration (1), it is possible to improve the cooling performance while ensuring castability in the first region 161. Moreover, with the above configuration (1), it is possible to reduce the flow rate of cooling air CA by improving the cooling performance.

(2) In some embodiments, in the above configuration (1), the first region 161 may be a region closest to a leading edge 11*a* of the airfoil part (blade body 11) in the pin fin passage 16.

The region closest to the leading edge 11*a* of the airfoil part (blade body 11) in the pin fin passage 16 has a larger distance (passage width W) between the pair of facing inner walls 17 constituting the pin fin passage 16 than the other regions, making the length of the pin fins 26 longer and more difficult to cast than the other regions.

With the above configuration (2), in the first region 161, where the length of the pin fins 26 is longer and more difficult to cast than in the other regions, it is possible to improve the cooling performance while ensuring castability in the first region 161.

(3) In some embodiments, in the above configuration (1) or (2), the second region 162 may be adjacent to the first region 161.

With the above configuration (3), it is possible to improve the cooling performance while ensuring castability in the region (first region 161) adjacent to the leading edge 11*a* side of the second region 162.

(4) In some embodiments, in any one of the above configurations (1) to (3), the pin fin passage 16 may include a third region 163 on the trailing edge 11*b* side of the second region 162. The plurality of pin fins 26 may include a plurality of third pin fins 263 disposed in the third region 163. A value (p3/d3) obtained by dividing a third pin pitch p3 of the plurality of third pin fins 263 by a third diameter d3 of the plurality of third pin fins 263 may be larger than a value (p2/d2) obtained by dividing the second pin pitch p2 by the second diameter d2.

In the third region 163 on the trailing edge 11*b* side of the second region 162, the cooling performance may be more suppressed than in the second region 162. Therefore, the value (p3d3) obtained by dividing the third pin pitch p3 by the third diameter d3 may be larger than the value (p2/d2) obtained by dividing the second pin pitch p2 by the second diameter d2.

With the above configuration (4), by increasing the value (p3/d3) obtained by dividing the third pin pitch p3 by the third diameter d3, the size of the third pin pitch p3 relative to the third diameter d3 increases, so that the proportion of the third pin fins 263 in the pin fin passage 16 decreases, suppressing the pressure loss of cooling air CA in the third region 163.

(5) In some embodiments, in the above configuration (4), the third diameter d3 may be equal to the second diameter d2.

In the third region 163 on the trailing edge 11*b* side of the second region 162, the distance (passage width W) between the pair of facing inner walls 17 constituting the pin fin passage 16 is smaller than that in the second region 162. Therefore, there is no need to make the third diameter d3 of the plurality of third pin fins 263 larger than the second diameter d2 of the plurality of second pin fins 262 as in the first region 161. With the above configuration (5), since the third diameter d3 is equal to the second diameter d2, the diameter-pitch ratio p/d, which has a significant effect on the cooling performance, can be set only by the relationship between the second pin pitch p2 and the third pin pitch p3. Therefore, the cooling performance in the third region 163 can be easily set at the design stage of the turbine blade 10.

(6) In some embodiments, in the above configuration (4) or (5), the third pin pitch p3 may be larger than the second pin pitch p2.

In the third region 163 on the trailing edge 11*b* side of the second region 162, the cooling performance may be more suppressed than in the second region 162. Therefore, the value (p3/d3) obtained by dividing the third pin pitch p3 by the third diameter d3 may be larger than the value (p2/d2) obtained by dividing the second pin pitch p2 by the second diameter d2.

To increase the value (p3/d3) obtained by dividing the third pin pitch p3 by the third diameter d3, the third pin pitch p3 may be increased, or the third diameter d3 may be decreased. However, when the third diameter d3 is decreased, the castability of the third pin fins 263 may decrease.

With the above configuration (6), since the value (p3/d3) obtained by dividing the third pin pitch p3 by the third diameter d3 is increased by making the third pin pitch p3 larger than the second pin pitch p2, the castability of the third pin fins 263 can be ensured even when the value (p3/d3) obtained by dividing the third pin pitch p3 by the third diameter d3 is increased.

(7) in some embodiments, in any one of the above configurations (4) to (6), the third pin pitch p3 may be equal to or larger than the first pin pitch p1.

As described above, the value (p1/d1) obtained by dividing the first pin pitch p1 by the first diameter d1 is smaller than the value (p2/d2) obtained by dividing the second pin pitch p2 by the second diameter d2. Further, the value (p3/d3) obtained by dividing the third pin pitch p3 by the third diameter d3 may be larger than the value (p2/d2) obtained by dividing the second pin pitch p2 by the second diameter d2. Therefore, the value (p3/d3) obtained by dividing the third pin pitch p3 by the third diameter d3 may be larger than the value (p1/d1) obtained by dividing the first pin pitch p1 by the first diameter d1. Accordingly, as in the above configuration (7), the third pin pitch p3 may be equal to or larger than the first pin pitch p1.

(8) In some embodiments, in any one of the above configurations (4) to (6), the third pin pitch p3 may be smaller than the first pin pitch p1.

As described above, the value (p3/d3) obtained by dividing the third pin pitch p3 by the third diameter d3 may be larger than the value (p1/d1) obtained by dividing the first pin pitch p1 by the first diameter d1. If the value (p3/d3) obtained by dividing the third pin pitch p3 by the third diameter d3 is larger than the value (p1/d1) obtained by dividing the first pin pitch p1 by the first diameter d1, as in the above configuration (8), the third pin pitch p3 can be smaller than the first pin pitch p1.

(9) A gas turbine 100 according to at least one embodiment of the present disclosure includes the turbine blade 10 having any one of the above configurations (1) to (8).

With the above configuration (9), since the flow rate of cooling air CA in the turbine blade 10 can be suppressed, it is possible to improve the performance of the gas turbine 100.

The invention claimed is:

1. A turbine blade, comprising:

an airfoil part;

a pin fin passage formed inside a trailing edge portion of the airfoil part, extending toward a trailing edge of the airfoil part, and opening to an outside of the airfoil part at the trailing edge; and a plurality of pin fins connecting a pair of facing inner walls constituting the pin fin passage, wherein the pin fin passage includes a first region, and a second region on the a trailing edge side of the first region, wherein the plurality of pin fins includes a plurality of first pin fins disposed in the first region and a plurality of second pin fins disposed in the second region, wherein a first diameter of each pin fin of the plurality of first pin fins is larger than a second diameter of each pin fin of the plurality of second pin fins, wherein a first pin pitch between the plurality of first pin fins in a direction parallel to a vertical axis of the airfoil part is larger than a second pin pitch between the plurality of second pin fins in the direction parallel to the vertical axis, wherein a first pin pitch between the plurality of first pin fins in a direction perpendicular to the vertical axis is larger than a second pin pitch between the plurality of second pin fins in the direction perpendicular to the vertical axis, wherein a value obtained by dividing the first pin pitch between the plurality of first pin fins in the direction parallel to the vertical axis by the first diameter is smaller than a value obtained by dividing the second pin pitch between the plurality of second pin fins in the direction parallel to the vertical axis by the second diameter, and wherein a value obtained by dividing the first pin pitch between the plurality of first pin fins in the direction perpendicular to the vertical axis by the first diameter is smaller than a value obtained by dividing the second pin pitch between the plurality of second pin fins in the direction perpendicular to the vertical axis by the second diameter.

2. The turbine blade according to claim 1, wherein the first region is a region closest to a leading edge of the airfoil part in the pin fin passage.

3. The turbine blade according to claim 1, wherein the second region is adjacent to the first region.

4. The turbine blade according to claim 1, wherein the pin fin passage includes a third region on a trailing edge side of the second region, wherein the plurality of pin fins includes a plurality of third pin fins disposed in the third region, each pin fin of the plurality of third pin fins having a third diameter, wherein a value obtained by dividing a third pin pitch between the plurality of third pin fins in the direction parallel to the vertical axis by the third diameter is larger than the value obtained by dividing the second pin pitch between the plurality of second pin fins in the direction parallel to the vertical axis by the second diameter, and wherein a value obtained by dividing a third pin pitch between the plurality of third pin fins in the direction perpendicular to the vertical axis by the third diameter is larger than the value obtained by dividing the second pin pitch between the plurality of second pin fins in the direction perpendicular to the vertical axis by the second diameter.

5. The turbine blade according to claim 4, wherein the third diameter is equal to the second diameter.

6. The turbine blade according to claim 4, wherein the third pin pitch between the plurality of third pin fins in the direction parallel to the vertical axis is larger than the second pin pitch between the plurality of second pin fins in the direction parallel to the vertical axis, and wherein the third pin pitch between the plurality of third pin fins in the direction perpendicular to the vertical axis is larger than the second pin pitch between the plurality of second pin fins in the direction perpendicular to the vertical axis.

7. The turbine blade according to claim 4, wherein the third pin pitch between the plurality of third pin fins in the direction parallel to the vertical axis is equal to or larger than the first pin pitch between the plurality of first pin fins in the direction parallel to the vertical axis, and wherein the third pin pitch between the plurality of third pin fins in the direction perpendicular to the vertical axis is equal to or larger than the first pin pitch between the plurality of first pin fins in the direction perpendicular to the vertical axis.

8. The turbine blade according to claim 4, wherein the third pin pitch between the plurality of third pin fins in the direction parallel to the vertical axis is smaller than the first pin pitch between the plurality of first pin fins in the direction parallel to the vertical axis, and wherein the third pin pitch between the plurality of third pin fins in the direction perpendicular to the vertical axis is smaller than the first pin pitch between the plurality of first pin fins in the direction perpendicular to the vertical axis.

9. A gas turbine, comprising the turbine blade according to claim 1.

10. The turbine blade according to claim 1, wherein the first pin pitch between the plurality of first pin fins in the direction parallel to the vertical axis is different from the first pin pitch between the plurality of first pin fins in the direction perpendicular to the vertical axis.

11. The turbine blade according to claim 1, wherein the first pin pitch between the plurality of first pin fins in the direction parallel to the vertical axis is equal to the first pin pitch between the plurality of first pin fins in the direction perpendicular to the vertical axis.

12. The turbine blade according to claim 1, wherein the second pin pitch between the plurality of second pin fins in the direction parallel to the vertical axis is different from the second pin pitch between the plurality of second pin fins in the direction perpendicular to the vertical axis.

13. The turbine blade according to claim 1, wherein the second pin pitch between the plurality of second pin fins in the direction parallel to the vertical axis is equal to the second pin pitch between the plurality of second pin fins in the direction perpendicular to the vertical axis.

14. The turbine blade according to claim 4, wherein the third pin pitch between the plurality of third pin fins in the direction parallel to the vertical axis is different from the third pin pitch between the plurality of third pin fins in the direction perpendicular to the vertical axis.

15. The turbine blade according to claim 4, wherein the third pin pitch between the plurality of third pin fins in the direction parallel to the vertical axis is equal to the third pin pitch between the plurality of third pin fins in the direction perpendicular to the vertical axis.

* * * * *